(12) United States Patent
Baker et al.

(10) Patent No.: US 8,993,111 B2
(45) Date of Patent: Mar. 31, 2015

(54) BLOCKING AND STAIN RESISTANT SURFACE TREATED ARTICLES AND METHODS FOR MAKING

(75) Inventors: Bonnie E. Baker, Warrington, PA (US); Arnold S. Brownell, Lansdale, PA (US); Nancy P. Buford, King of Prussia, PA (US); Willie Lau, Lower Gwynedd, PA (US); Joseph J. Spanier, Souderton, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1415 days.

(21) Appl. No.: 12/589,587

(22) Filed: Oct. 26, 2009

(65) Prior Publication Data

US 2010/0112344 A1 May 6, 2010

Related U.S. Application Data

(60) Provisional application No. 61/197,963, filed on Oct. 31, 2008, provisional application No. 61/198,076, filed on Nov. 3, 2008.

(51) Int. Cl.
*C08K 5/52* (2006.01)
*B05D 3/10* (2006.01)
*C09D 143/02* (2006.01)

(52) U.S. Cl.
CPC .................................. *C09D 143/02* (2013.01)
USPC ........... 428/341; 428/500; 428/511; 525/210; 525/244

(58) Field of Classification Search
None
See application file for complete search history.

(56) References Cited

U.S. PATENT DOCUMENTS

| 5,074,883 A | 12/1991 | Wang |
| 5,674,558 A | 10/1997 | Speer |
| 5,738,687 A | 4/1998 | Kamrath et al. |
| 2002/0102382 A1 | 8/2002 | Kwong et al. |
| 2003/0149165 A1* | 8/2003 | Brown et al. ................. 524/556 |
| 2005/0027079 A1* | 2/2005 | Palmer Lauer et al. ....... 525/244 |
| 2005/0119391 A1* | 6/2005 | Mason et al. ................. 524/445 |
| 2006/0142493 A1* | 6/2006 | Hughes et al. ................ 525/210 |
| 2007/0096052 A1 | 5/2007 | Shuey et al. |
| 2007/0099816 A1 | 5/2007 | Scheuing et al. |
| 2007/0113353 A1 | 5/2007 | Pivonka et al. |
| 2007/0232770 A1 | 10/2007 | Jacobson et al. |
| 2008/0022463 A1 | 1/2008 | Hopkins et al. |
| 2008/0206469 A1* | 8/2008 | Brownell et al. .......... 427/385.5 |

FOREIGN PATENT DOCUMENTS

| EP | 1078961 A1 | 2/2001 |
| JP | 57092031 A | 6/1982 |
| JP | 58079027 A | 5/1983 |
| JP | 6128524 A | 5/1994 |
| JP | 09003289 A | 7/1997 |
| WO | WO 92/16309 | 10/1992 |
| WO | 0039181 A1 | 7/2000 |
| WO | WO 2006/061334 A1 | 6/2006 |
| WO | WO 2008/071957 A1 | 6/2008 |

OTHER PUBLICATIONS

Partial European Search Report issued in Application No. EP 09 17 3381, dated Jan. 5, 2012.
Partial European Search Report issued in Application No. EP 09 17 3381, dated Jul. 12, 2011.

* cited by examiner

*Primary Examiner* — Ronak Patel
(74) *Attorney, Agent, or Firm* — Andrew E. C. Merriam

(57) ABSTRACT

The present invention provides surface treated articles comprising a recoatable surface treatment of an acrylic or vinyl polymer that does not change the appearance of the treated surface, and which imparts blocking resistance and/or stain and dirt pickup resistance to the treated surface. The one or more acrylic or vinyl polymer has a number average molecular weight of from 1,000 to 100,000, a glass transition temperature of −10° C. or higher, preferably, 30° C. or higher, and comprises the polymerization product of one or more nonionic monomer, such as methyl methacrylate, with up to 47 wt. % of an ethylenically unsaturated acid monomer and, preferably, is non-migrating under use conditions. When dry, the surface treatments may form a layer of domains of polymer distributed all over the treated surface, rather than a film. Treated articles include coating or painted articles and elastomer films.

10 Claims, No Drawings

BLOCKING AND STAIN RESISTANT SURFACE TREATED ARTICLES AND METHODS FOR MAKING

This invention claims priority to U.S. Provisional Application No. 61/197,963 filed Oct. 31, 2008 and Provisional Application No. 61/198,076 filed Nov. 3, 2008.

The present invention relates to articles surface treated with one or more aqueous emulsion or dispersion of a low molecular weight acrylic or vinyl polymer, thereby providing a recoatable surface that exhibits superior resistance to film blocking and resistance to stains and that does not change the appearance of the treated surface, and to methods of applying such surface treatments. More particularly, it relates to painted or coated surfaces that are treated with one or more aqueous emulsion or dispersion of an acrylic or vinyl polymer comprising the polymerization product of up to 47 wt. % of one or more of one or more ethylenically unsaturated acid monomer and having a glass transition temperature (Tg) of $-10°$ C. or higher and a number average molecular weight (Mn) of from 1,000 to 100,000, thereby providing a recoatable surface that is resistant to film blocking, and to methods for applying such surface treatments.

Paint and lacquer often comes in contact with itself, especially in window and door areas, and sometimes sticks to itself, or blocks. Blocking is particularly evident in paints and coatings that are low in volatile organic compounds (VOCs) or that are soft, flexible or rubbery.

Industrial applications, such as concrete roof tiles, and factory applied window finishes, tend to use solvent borne coatings that have undesirably high VOC contents. To avoid high VOC contents, applicators use water borne coatings. However, water borne coatings exhibit unacceptable block resistance in industrial coatings as they are intended to provide all of film barrier formation, adhesion, flexibility and gloss performance properties without undue brittleness in factory applied coatings.

In one approach to prevent blocking, paint or coating formulators add flourine or silicon containing additives to the paint, or binder manufacturers incorporate flourine or silicon into their binders for use in paints and coatings. However, surface treatments that are effective to prevent blocking provide levels of flourine and silicon on the treated surface that are high enough that they provide notoriously poor surface adhesion properties and are not recoatable. Further, compositions containing flourine and silicon are expensive and, especially in the case of fluorine, have proven hazardous to the environment.

Publication Number: US20070113353A1, to Pivonka et al. discloses surface treatments that improve water sheeting and soap scum resistance for polymeric articles having hydrophobic surfaces, the treatments comprising invisible, hydroscopic films of water-soluble or water-dispersible polymers made from (i) a first monomer capable of forming a cationic charge on protonation, such as (di)alkylamino(alkyl) (meth) acrylate, (ii) at least one of a second monomer that is acidic and that is capable of forming an anionic charge in the compositions, (iii) optionally, a third monomer that has an uncharged hydrophilic group; and (iv) optionally, a hydrophobic fourth monomer. Being hydroscopic, the surface treatments do not find utility in a recoatable surface treatment for painted or coated surfaces. Further, the surface treatments of Pivonka are not tested for durability.

The present inventors have sought to solve the problem of providing a recoatable surface treatment that reduces blocking of painted or coated or surfaces and elastomeric films, provides stain resistance, and, at the same time, does not change the appearance of the treated surface.

STATEMENT OF THE INVENTION

According to the present invention, surface treated articles comprise a recoatable surface treatment of one or more polymer that does not change the appearance of the treated surface. The surface treatment imparts blocking resistance and/or stain and dirt pickup resistance to the treated surface. In one embodiment, the polymer is non-migrating in use conditions, including, for example, the temperature of use and the substrate on which the surface treatment is applied. When dry, the surface treatments may form domains of polymer distributed all over the treated surface, rather than a film.

In any embodiment, the surface treated articles of the present invention have surface treatments in the amount of from 0.003 to 2 g of dry polymer per square meter of treated area ($g/m^2$), preferably up to $1.0 g/m^2$. The surface treatments may form domains distributed all over the treated surface when dry, rather than forming a film.

In one embodiment, surface treated articles resistant to blocking comprise painted or coated articles or elastomer films having a surface treatment of one or more dispersion or emulsion of an aqueous acrylic or vinyl polymer having a glass transition temperature (Tg) of $-10°$ C. or higher, or, preferably, $30°$ C. or higher, and a number average molecular weight (Mn) of from 1,000 to 100,000, preferably, 2,500 or more, or, more preferably, 4,000 or more and, preferably, 25,000 or less. The aqueous acrylic or vinyl polymer comprises the polymerization product of (i) one or more ethylenically unsaturated acid monomer chosen from an ethylenically unsaturated (poly)carboxylic acid monomer in the amount of from 0 to 47 wt. %, preferably, 0.1 wt. % or more, or, preferably, up to 20 wt. %, based on the total weight of monomers, an ethylenically unsaturated phosphorus-containing acid monomer in the amount of from 0.0 to 10 wt. %, an ethylenically unsaturated sulfur-containing acid monomer in the amount of from 0.0 to 10 wt. %, and mixtures thereof, and the remainder of one or more non-ionic acrylic and/or vinyl comonomer. The surface treatment polymers may consist essentially of the polymerization product of 53 wt. % or more, preferably, 70 wt. % or more one or more non-ionic acrylic and/or vinyl comonomer. Suitable non-ionic acrylic or vinyl comonomers have a solubility in water of less than 5 g/100 g of water at $25°$ C. Preferred monomers for use in making polymers for such surface treatments include methyl methacrylate (MMA), isobornyl methacrylate (IBOMA), aryl (meth)acrylates, styrene, and mixtures thereof. Preferably, the surface treatment polymer is one or more polymer that is non-migrating under use conditions.

The recoatable acrylic or vinyl polymer surface treatments for coated or painted articles are substantially fluorine and silicone free, and, preferably, contain no fluorine or silicone.

Surface treated painted or coated articles may be chosen from windows, window joinery, cabinets, walls, wall trim, floor trim, and molding; table tops and counter tops; doors, door frames, and doorskins; furniture; roof rolls, exterior building and construction siding and molding; coated roof tiles, edge sealers, paneling, millwork, office, hardboard, or decking. The coatings or paints on the treated articles may be factory applied.

In another embodiment, elastomer films, such as extruded films, may be surface treated with the same recoatable acrylic or vinyl polymer surface treatments that are useful in surface treatments for painted or coated articles.

In one embodiment, the surface treated painted, coated or film surfaces resistant to film blocking comprise a surface treatment of one or more acrylic or vinyl polymer chosen from polymers having a number average molecular weight (Mn) of 4,000 or more, polymers having a glass transition temperature (Tg) of 30° C. or more, and mixtures thereof. Preferably, the one or more acrylic or vinyl polymer has a Tg of at least 50° C., or more preferably, at least 70° C.

In another embodiment, aqueous acrylic or vinyl polymers for surface treatments resistant to film blocking have an average degree of polymerization (DP) of greater than 30 and may be chosen from any polymer having a Tg that is greater than the use temperature, any polymer that is 20° C. or more different from the Tg of the polymer in the paint, coating or film on the surface of the treated substrate, and mixtures thereof. In this embodiment, surface treatment polymers having an Mn of 30,000 or less may be used to treat coated leather surfaces.

In another embodiment, non-migrating aqueous acrylic or vinyl polymers for surface treatments resistant to film blocking have an average DP of 30 or less, and, to insure incompatibility with the treated surface, may be chosen from any polymer that has a Hansch parameter differing by 0.35 or more from the Hansch parameter of the polymer in the paint or coating or the material that makes up the treated article surface.

In yet another embodiment, the block resistant surface treated articles having soft (Tg of 20° C. or less) or rubbery surfaces, e.g. from paints, coatings or films, comprise those treated with a surface treatment comprising one or more aqueous acrylic or vinyl polymer that is the polymerization product of 17 wt. % or less of a monomer that gives a rubbery or soft polymer, such as, for example, butyl acrylate or $C_{12}$ or higher alkyl (meth)acrylates.

In addition, according to the present invention, easy to clean surface treated articles have surface treatments that are resistant to stains and to dirt or soil and comprise articles wholly constructed of and/or laminated with wood, wood fiber, wood particles, wood chips, glass, formica, ceramic, e.g. tile, fiber reinforced plastic, plastic, concrete, paper, aluminum, textiles, fabrics, and non-wovens, wherein the surface treatment comprises domains of one or more aqueous acrylic or vinyl polymer that is the polymerization product, based on the total weight of monomers, of (i) from 0.0 to 25 wt. %, preferably, 0.1 wt. % or more, or, preferably, up to 15 wt. %, of an ethylenically unsaturated acid monomer chosen from an ethylenically unsaturated monocarboxylic acid monomer, from 0.0 to 20 wt. %, preferably, 0.1 wt. % or more, or, preferably, up to 15 wt. %, of an ethylenically unsaturated polycarboxylic acid monomer, from 0.0 to 10 wt. % of an ethylenically unsaturated phosphorus-containing acid monomer, from 0.0 to 10 wt. % of an ethylenically unsaturated sulfur-containnng acid monomer, and mixtures thereof, and (ii) the remainder of one or more non-ionic acrylic and/or vinyl comonomer, the polymer having an Mn of from 2,000 to 30,000 and a glass transition temperature (Tg) of −10° C. or higher. Such surface treatments that are resistant to stains and to dirt or soil may also be applied to coated leather as a surface treatment that is resistant to film blocking, as described above. The acrylic or vinyl polymer surface treatment is substantially fluorine and silicone free, and, preferably, contains no fluorine or silicone. The surface treatment polymers may form domains distributed all over the treated surface, rather than a film. Preferably, the surface treatment polymer is non-migrating under use conditions.

Preferably, the treated articles having easy to clean, stain resistant surface treatments are chosen from windows, window joinery, doors, cabinets, walls, wall trim, floor trim, molding, table tops, counter tops, e.g. decorative laminates, vanities and sink tops.

In another embodiment, the methods for making blocking resistant surface treatments comprise applying the aqueous acrylic or vinyl polymer of the present invention to a coated or painted article or elastomer film. Such methods may comprise painting or coating an article and treating freshly applied or tacky paint with the aqueous polymer surface treatment 0.05 minute or longer, for example, 0.1 minute or longer, or, for example, up to 30 days after painting or coating. Alternatively, the acrylic polymer surface treatment can be applied to painted or coated articles that have been dried, such as those that were painted or coated many years before. The same methods may also be used applying the above described aqueous polymer surface treatments for easy to clean, stain resistant surface treatments.

In any embodiment of the present invention where the one or more polymer used in the surface treatment does not comprise acrylic or vinyl polymer copolymerized ethylenically unsaturated acid, i.e. is not acid functional, the aqueous surface treatments may further comprise one or more surfactant.

Unless otherwise stated herein, all temperature units are room temperature and all pressure units are standard pressure.

All ranges recited are inclusive and combinable. For example, an Mn for an acrylic or vinyl polymer of 1,000 or more, or 4,000 or more and up to 100,000, or up to 30,000, or up to 20,000 will include ranges of 1,000 or more to 100,000 or less, 4,000 or more to 100,000 or less, 20,000 or more to 100,000 or less, 30,000 or more to 100,000 or less, 1,000 or more to 4,000 or less, 1,000 or more to 20,000 or less, 1,000 or more to 30,000 or less, 4,000 or more to 20,000 or less, 4,000 or more to 30,000 or less, and 20,000 or more to 30,000 or less.

All phrases comprising parenthesis denote either or both of the included parenthetical matter and its absence. For example, the phrase "(co)polymer" includes, in the alternative, polymer, polymer and mixtures thereof.

As used herein, the term "acrylic" refers to both acrylic and methacrylic polymers, including copolymers thereof with vinyl monomers, e.g. styrene.

As used herein, the phrase "aqueous" shall mean water or water mixed with 50 wt. % or less, based on the weight of the mixture, of water-miscible solvent.

As used herein, the phrase "60° Gloss" refers to the gloss of a coated article or coating, measured at a 60° viewing angle using a Micro-TRI Gloss™ meter (Byk-Gardner, USA, Columbia, Md.).

As used herein, the term "appearance" refers to the color and sheen (gloss) of an article.

As used herein, the phrase "average degree of polymerization" or "average DP" refers to the number average molecular weight or Mn of a given polymer divided by the weighted average formula weight of the monomers making up the polymer. For example, a polymer with an Mn of 5,000 and polymerized from 80 wt. % of styrene and 20 wt. % of methacrylic acid (MAA), based on the total weight of monomers, would have an average DP of 5,000 divided by the sum [(0.8)(styrene formula wt.)+(0.2)(MAA formula wt.)]=5,000/(0.8×104.15+0.2×86.09)=5,000/(83.32+17.22)=5,000/100.54=49.73 average DP.

As used herein, the term "blocking" refers to the tendency of painted or coated surfaces or films to stick together (block) when stacked or placed in contact with each other under pressure; "tack" refers to the noise produced upon separation of blocked surfaces; and, "seal" refers to the physical damage to a paint film caused by the separation of blocked surfaces.

As used herein, the phrase "dispersion" includes emulsions as well as dilute solutions of polymer where the polymer is present in amounts lower than the proportion that would dissolve in water at room temperature. Or example, if a certain acid functional acrylic copolymer with an Mn of 5,000 dissolves up to 5 g per 100 g of $H_2O$, then a formulation of ≤5 wt. % of the polymer in water is termed a dispersion even if it might form a solution.

As used herein, the term "non-ionic acrylic and/or vinyl comonomers" shall mean that the polymerized monomer residue does not bear an ionic charge at a pH of from 2 to 13.

As used herein, unless otherwise indicated, the term "number average molecular weight (Mn)" refers to the number average molecular weight of a polymer as measured by gel permeation chromatography (GPC) against a polystyrene standard.

As used herein, the phrase "substantially fluorine and silicone free" refers to an acrylic polymer surface treatment which, after drying, contains less than 0.2 wt. % of a fluorine or silicon compound or polymerized monomer.

As used herein, the phrase "stain resistance" refers to the property of a surface treatment that resists or prevents stains from sticking to a substrate.

As used herein, the phrase "Tg" shall mean glass transition temperature measured by differential scanning calorimetry (DSC) taking the inflection point in the thermogram as the Tg value. In the case of a multi-stage polymer, the reported Tg value shall be the weighted average of the observed inflection points in the thermogram.

As used herein, the phrase "vinyl" or "vinyl monomer" shall mean acrylic, vinyl ester, vinyl ether, monovinyl aromatic compounds, such as styrene and a-methyl styrene, and vinyl halides.

As used herein, the phrase "wt. %" shall mean percent by weight.

The present inventors have found that that the polymer surface treatment of the present invention will not change the appearance of the treated surface, e.g. paint, onto which it has been applied is recoatable as it comprises an acrylic, vinyl or vinyl acrylic polymer, and which, preferably, is stain and dirt pick-up resistant. In application to coated substrates conferring blocking resistance, the surface treatment reduces the frequency of painting or coating. Likewise, in applications to make treated surfaces easy to clean, such as treating wallpaper, the surface treatment can reduce the frequency of re-papering by providing stain resistance and making the surface easy to clean.

In general, the one or more acrylic or vinyl polymer may have a Tg of −10° C. or higher, preferably, 30° C. or higher, or 50° C. or higher, or 70° C. or higher, and up to 300° C. For conferring blocking resistance to coated or painted articles or elastomer films, the polymers may have an Mn of from 1,000 to 100,000, preferably, 25,000 or less. Suitable examples of acrylic or vinyl polymers for use in the surface treatments include, for example, polymers of (meth)acrylic acid or phosphoalkyl (meth)acrylate with MMA, BA, IBOMA, styrene, or mixtures thereof, and polymers of styrene with styrene sulfonate or acrylamidopropane sulfonate.

In blocking resistance surface treatments according to the present invention, the one or more acrylic or vinyl polymer in the surface treatment does not migrate into the treated surface after the volatiles in a surface treatment have either evaporated or migrated into the substrate, i.e. it is non-migrating. Suitable non-migrating surface treatment compositions may comprise any acrylic or vinyl polymer chosen from those having an Mn of 4000 or more, and those having Mn of 1,000 or more and that develop incompatibility with the treated surface in use conditions. Suitable non-migrating polymers are any having an average degree of polymerization (DP) of more than 30 and any having an average DP of 30 or less, which have, for example, an Mn of from 1,000 and up to 4,000, that develop incompatibility with the treated surface. In one embodiment, the non-migrating polymer is any having an average DP of 20 or less that has a Hansch parameter differing by 0.35 or more from the Hansch parameter of the polymer in the paint or coating or the material that makes up the treated article surface. See (Kaufman. S. H.; Falcetta, J. J. (Eds.) *Introduction to Polymer Science and Technology*, Wiley, NY: 1977); and see (C. Hansch, Accounts of Chemical Research, 1969, Volume 2, page 232).\

The Hansch parameter quantitatively measures hydrophobicity of a molecule. The value of a Hansch parameter for any molecule, e.g. a polymer, herein is calculated by summing the contribution from each copolymerized monomer weighted by the weight fraction of the monomer in that polymer. Decreasing monomer contribution values indicate increasing solubility of a molecule in water. Contribution values for monomers include: Methyl methacrylate, 1.2751; methacrylic acid, 0.9888; acrylic acid, 0.4415; itaconic acid, −0.3434; methyl acrylate, 0.7278; ethyl acrylate, 1.2189; vinyl acetate, 0.7278; IBOMA, 4.7589; styrene, 2.8950; butyl acrylate, 2.2011; butyl methacrylate, 2.7488; isobutyl methacrylate, 2.6749; ethyl methacrylate, 1.7662; 2-ethylhexyl methacrylate, 4.5831; lauryl acrylate, 6.1299; lauryl methacrylate, 6.6772; and n-dodecyl mercaptan 5.7800. For example, for a polymer including 45 wt. % MMA and 55 wt. % BMA, one would calculate the polymer Hansch parameter as 0.45 (MMA Hansch)+0.55 (BMA Hansch)=0.45 (1.2751)+0.55 (2.7488)=2.0856.

In blocking resistant surface treatments, any surface treatment polymer having an average DP greater than 30 may preferably be chosen from any polymer having a Tg greater than the temperature of normal use, any polymer that is incompatible with the treated substrate, and mixtures thereof. For example, a preferred treatment polymer having an average DP greater than 30 may preferably have a Tg greater than 50° C., or, more preferably, 70° C. or greater. In another example, the preferred treatment Incompatible polymer is any that has a Tg differing by, for example, at least 20° C. or, by at least 30° C., from the material, e.g. polymer, of the treated substrate, thereby insuring the incompatibility of polymer and substrate.

In one embodiment, blocking resistant surface treatments for articles with soft (Tg of 30° C. or less) or rubbery surfaces, e.g. paints, coatings or films, may comprise one or more acrylic or vinyl polymer having less than 17 wt. % of copolymerized residues from monomers that form rubbery or soft polymers when homopolymerized. Preferably, the polymers useful in such surface treatments are chosen from those having a Tg greater than 50° C., or, more preferably, 70° C. or greater, those having a Tg differing by, for example, at least 20° C. or, by at least 30° C., from the material, e.g. polymer, of the treated substrate, any polymer that is non-migrating in use conditions, and mixtures thereof.

In another embodiment, blocking resistant surface treatments comprising polymers having an Mn of 30,000 or less are useful in treating coated leather to confer stain resistance and dirt pickup resistance.

In another embodiment, surface treatments that are resistant to stains and to dirt or soil for articles wholly constructed of and/or laminated with wood, wood fiber, wood particles, wood chips, glass, formica, ceramic, e.g. tile, fiber reinforced plastic, concrete, paper, aluminum, textiles, fabrics, non-wovens, and plastic may comprise one or more acrylic or vinyl polymer chosen from such polymers comprising the copolymerization product of (i) 5 wt. % to 35 wt. % of one or more hydrophobic monomer, such as a $C_4$ or higher alkyl (meth) acrylate.monomers, or monomer that forms rubbery or soft polymers (Tg of 30° C. or less) when homopolymerized, with (ii) of 10 wt. % or less, preferably 5 wt. % or less, of ethylenically unsaturated acids.

In easy to clean surface treatment embodiments, resistance to greasy and oily stains and scuff marks may be provided by non-migrating acrylic or vinyl polymers that have a Tg of −10° C. or more that are the polymerization product of from 20-99 wt. % of a $C_4$ or higher alkyl (meth)acrylate with ethylenically unsaturated acids, or, preferably, 30 wt. % or less to maintain stain resistance.

Suitable acrylic or vinyl polymers of the present invention can comprise the polymerization product of one or more ethylenically unsaturated acid, for example, (poly)carboxylic acids like (meth)acrylic acid, itaconic acid and maleic acid; phosphorus containing acids, such as phosphoalkyl methacrylate, especially for scrub resistance; and sulfur containing acids, such as styrene sulfonate, with the remainder of one or more non-ionic acrylic and/or vinyl comonomers, such as $C_1$ to $C_{30}$ alkyl (meth)acrylates, like methyl methacrylate (MMA), ethyl acrylate (EA), butyl acrylate (BA), isobornyl methacrylate (IBOMA), and lauryl methacrylate (LMA); and vinyl monomers, such as styrene.

The acrylic or vinyl polymers can be formed by any known means, such as emulsion or mini-emulsion, bulk, suspension polymerization of a monomer charge or a monomer feed. Gradual addition polymerization methods are preferred.

The molecular weight of the acrylic or vinyl polymer can be controlled by known means, such as, for example, inclusion of a chain transfer agent or CTA, such as a mercaptan, like n-dodecyl mercaptan (nDDM); a hypophosphite, such as sodium hypophosphite (SHP) in the amount of 0.1 to 20 wt. %, preferably 1 wt. % or more, for example, 1.9 wt. % or more, or, preferably, up to 10.0 wt. %, based on the total weight of monomers in the polymerization. The molecular weight is inversely proportional to CTA concentration.

Suitable acrylic or vinyl polymers for use in blocking resistance applications generally have an Mn ranging from 1,000 or more and as high as 100,000, preferably 4,000 or more, or, preferably, 50,000 or less, in surface treatments for painted or coated articles, and elastomer films. In surface treatments that provide stain, dirt or soil resistant easy to clean surfaces, suitable acrylic or vinyl polymers can have an Mn of 2,000 or more, and up to 30,000, preferably 20,000 or less, or, more preferably, 4,000 or more.

The surface treatments of the present invention do not alter the surface appearance of articles treated therewith. The surface treatments may be applied in small amounts, such as, for example, 0.003 to 2 g of dry polymer per square meter of treated area (g/m$^2$), and, to insure that the treatment does not change the appearance of treated surfaces, preferably from 0.01 to 1 g/m$^2$.

The surface treatment compositions are formulated at low solids (<5%), dilute dispersion. Such compositions can comprise from 0.1 to 10 wt. % of the acrylic or vinyl polymer in water, based on the total weight of the composition, preferably, 0.25 to 5 wt. %, or 1 wt. % or more; or 2 wt. % or more.

In another embodiment, the surface treatment composition comprises an aqueous concentrate of the acrylic or vinyl polymer that has a solids content of up to 70 wt. % and as low as 5 wt. %, preferably 10-60 wt. %.

Any surface treatment can confer mold, mildew, and/or algae resistance by including one or more antimicrobial therein.

Suitable formulation additives may include, for example, antimicrobials, surfactants, buffering agents, fragrances, stabilizers, antioxidants, defoamers, preservatives, fluorescent additives, extenders and mixtures thereof. Such additives may be used in conventional amounts.

For anti-microbial compositions, the acrylic or vinyl polymer compositions of the present invention may comprise from 0.001 to 5 wt. % of one or more anti-microbial, such as, for example, crosslinked polymer nanoparticles (average particle size ≤500 nm) comprising heterocycle groups, such as imidazole, benzotriazole and benzimidazole; crosslinked polymer nanoparticles complexed with a metal, such as copper, silver, or tin; silver ion containing soluble glass, like IonPure™ from Marubeni America (Santa Clara, Calif.); and quaternary ammonium containing organic compounds.

Methods of applying the surface treatment to the article may comprise wiping, e.g. with a towelette, spraying or atomizing, e.g. with an airbrush sprayer or spray bottle, sponging, such as in a kit prepackaged with applicator, e.g. sponge or foam tipped nozzle, brushing or roll dripping. The concentration of the acid functional acrylic polymer varies depending on the application method. Thus, for spraying, the acrylic or vinyl polymer content may range from 2 to 8 wt. %, based on the total weight of the composition; for brushing and rolling, the content of such polymers may range from 0.1 to 2.0 wt. %, based on the total weight of the composition; or, for wipes or towellettes, the content of such polymers may range from 1 to 10 wt. %, based on the total weight of the composition.

Painted or coated substrates may include stained and lacquered substrates, wall paper, wood, wood composites and laminates, cellulosic composites and laminates, plastic, linoleum, formica, masonry, glass, ceramics, plastics, metals, ceramics, concrete, paper, and sheet rock, wall board and gypsum board.

In one embodiment, painted or coated articles include, for example, waterproofing membranes or rolls, for example, a white roofing membrane or roof roll. Such membranes are stored as rolls and can block badly. Suitable roofing membranes may be made from one or more felt or non-woven base layer impregnated with asphalt, rubber, and/or polymer, followed by a finish layer of elastomeric coating or film, with an optional fire management layer of aluminum foil or a fire retardant coating between the finish layer and the base layer.

Uses of the surface treatments of the present invention may include interior or exterior paint maintenance, e.g. window and door areas, preservation of rolls of painted or coated material or elastomer films, and protection of furniture, cabinets, countertops, table tops, vanity tops, ceiling tiles, wall tiles and counter tiles.

EXAMPLES

Test Methodologies Used in Examples

Peel Block Resistance (based on ASTM Standard Test Method for Blocking Resistance of Architectural Paints, Designation D4946-89 (1989)): Rates the resistance of paint film surfaces to blocking, i.e., sticking or fusing when they are placed in contact with each other. The paint to be tested was cast on a Leneta Plain White Form WB, sealed white chart (The Leneta Company, Mahwah, N.J.), using a 75 μm (3 Mil) Bird-type applicator (Byk-Gardner, USA, Columbia, Md.)) applicator and the were conditioned in controlled temperature and humidity room (CTR) (25° C.; 50% RH) for 1 day. After conditioning, four 1½"×1½" sections (to run duplicates) were cut from white area of each conditioned chart and the cut sections were placed with the paint surfaces face to face in a 50° C. (120° F.) oven on a flat metal plate. In the oven, a heated, solid, number 8 rubber stopper was placed with narrow side down on top of each individual specimen and then a heated 1000 g. weight was placed each stopper. The force calculated for this setup is 127 g/cm2 (1.8 psi). After exactly 30 minutes (±1 min.), the stoppers and weights were removed and the test sections removed from the oven. After allowing the test specimens to cool 30 minutes at room temperature, the cut sections of each specimen was separated with slow and steady force at a pull apart angle of approximately 180°, while listening for tack. The samples were then rated for blocking resistance on a scale of 0 to 10±2 units, which corresponds to a subjective tack and seal rating determined by the operator. The rating system is defined in Table 1 below.

(Variant) Early Block Testing An alternate Peel Block Resistance testing method comprises applying a paint to a panel, then spraying the surface treatment after 30 minutes, when the paint is still tacky, and performing block testing on the freshly treated paint in a 50° C. oven.

All variations of the Peel Block Resistance Test rate samples on the scale in Table 1. Ratings of 0-3 are considered a fail while ratings of 4 and higher are passing block values.

TABLE 1

Peel Block Resistance Rating Scale

| Rating | Observation |
| --- | --- |
| 10 | No tack, perfect |
| 9 | Trace tack, excellent |
| 8 | Slight tack, very good |
| 7 | Slight tack, good |
| 6 | Moderate tack, good |
| 5 | Moderate tack, fair |
| 4 | Severe tack, no seal, fair |
| 3 | 5-25% seal, poor |
| 2 | 25-50% seal, poor |
| 1 | 50-75% seal, poor |
| 0 | Complete seal, very poor |

Surface Appearance Retention: The appearance of treated surfaces after treatment was measured to show that it did not change according to the following parameters:

?E and Change in Gloss: A ?E was measured on the Hunter Lab scale using a Minolta Chroma Meter, model CR 331. For low gloss paints, a ?E reading of 0.5 or below indicates that a material is not visible on the tested surface. For higher gloss paints, change in gloss is measured as the gloss lost after treatment. A change in 60° gloss of 15 units or less would be considered "not visible".

60° Gloss was measured using a Micro-TRI Gloss™ meter (from BYK-Gardner, USA, Columbia, Md.).

Visual observations of the treated painted panels were taken from the indicated distance and angle.

Federal Stain Resistance: Paint was drawn on black vinyl charts with a 175 μm (7 mil) Dow Latex Film Applicator (BYK-Gardner, USA, Columbia, Md.) and allowed to cure for 6 days in a CTR (25° C.; 50% RH). When the paint was cured, ½ of the chart was masked lengthwise and surface treated with a 5% aqueous dispersion of polymer, which treatment was allowed to dry for 1 day. When dry, "Initial Y reflectance" measurements were taken and a Federal stain (a greasy dirt prepared by high shear mixing of 50 parts Lanolin (usp anhydrous), 50 parts Petrolatum, 5 parts carbon black, 50 parts stick Margarine, and 10 parts mineral oil for about 15 minutes) was applied using a 3 inch ⅜" nap roller to a 6 inch section in the middle of the chart covering both the masked and unmasked area, allowed to sit on the painted surface overnight, and then the excess stain was wiped off. The stained chart was placed on a Gardco Washability and Wear Tester (Paul N. Gardner, Co, Inc., Pompano Beach, Fla.) equipped with a boat, weight and sponge having a total weight of 420 grams. The washability pan was flooded with a 5% Dawn™ solution (Proctor and Gamble, Cincinnati, Ohio) in water and used to saturate the sponge and then the Washability machine was run for 17 cycles and rinsed with tap water. Samples are let to dry and Y reflectance "Final Y reflectance" remeasured.

Federal Stain—Simple Method: The same procedure for testing Federal Stain Resistance was followed, except that sealed white Leneta form WB charts were painted with a 75 μm (3 mil) Bird-type applicator (A 3 mil Bird applicator is designed to give a wet film thickness of 3 mili inches or 3 mils. The actual gap clearance is 6 mils or 152.4 microns. Giving the gap clearance for both dow type and bird type bars is unnecessary. Those skilled in the art are familiar with mils and the differing conventions between U shaped (like Dow) and bird bars); the paint was allowed to dry overnight in a CTR (25° C.; 50% RH); the surface treatment was allowed to dry for 2 hours; Federal stain was applied with a 1" nylon brush and allowed to sit for 5 minutes; and, to clean the charts, a 5" strip of cheese cloth was dipped in a 5% Simple Green™ cleaner solution in water (Sunshine Makers, Inc., Huntington Beach, Calif.), and the excess liquid squeezed out before the cheese cloth was rubbed against the panel, back and forth for 25 strokes, turning as needed to keep a clean surface.

Leneta Stain Resistance: The same procedure for testing Federal Stain Resistance was followed, except that; Leneta ASTM Staining Media, Pigmented Type ST-1 (The Leneta Company, Mahwah, N.J.) was used; (Leneta stain was applied by drawing down using a 3 mil Bird applicator bar) 2 squirts of Fantastic™ All Purpose Cleaner (S.C. Johnson and Son, Inc., Racine, Wis.) was applied on the panel; 10 mL Fantastic™ cleaner was applied on the wet sponge; and the washability tester was run for 25 cycles.

Dirt Pickup Resistance (DPUR): Paints were drawn down over Aluminum panels with a 175 μm (7 mil) Dow Latex Film Applicator and were allowed to cure for 4-6 hours before being treated by spray applying a 5% formulation of the indicated treatment polymer formulated with 1% Aerosol OT-75 (Cytec Industries, Inc. West Paterson, N.J.) surfactant. Half of each panel was masked and left untreated. The treated panels were allowed to dry in a CTR (25° C.; 50% RH) overnight, and then placed outside facing South at a 45 degree angle for 6 days. After outside exposure, "Initial Y reflectance" measurements were made. Next, samples were placed in a fox box for 1.5 hours, and then patted dry. A brown iron oxide slurry (50% Mapico 422 iron oxide dispersed in water) was brush applied, allowed to dry for 4 hours, and was washed off under warm running water and rubbed with cheese cloth. After drying, "Final Y reflectance" values were measured.

Synthesis Example

Preparation of Emulsion Polymers

The emulsion polymers used in surface treatments in the following examples were made in a 4-liter round bottom reaction flask with four necks equipped with a mechanical stirrer, temperature control device, condenser, monomer and initiator feed lines and a nitrogen inlet according to the following procedure Deionized water (500 g) and an anionic surfactant (25 g, 30% active in water), were introduced into the reaction flask at room temperature to form a reaction mixture. The contents were heated to 85° C. while stirring under nitrogen purge. At 85° C., sodium carbonate (5.3 g in 20 g of water) was added to the reaction mixture followed by sodium persulfate (5.3 g in 50 g of water). Then, cyclodextrin or CD (7.5 g) was added.

Monomer emulsions consisting of 500 g deionized water, 12.5 of the anionic surfactant, 1500 g monomers and chain transfer agent, all in the proportion indicated in Table 2, below, based on monomer weight, were prepared in a separate container. At 85° C., the monomer emulsion was fed into the reaction flask over 120 minutes together with a cofeed solution of sodium persulfate (1 g in 120 g of water). At the end of the monomer emulsion feed, the reaction mixture was held at 85° C. for 20 minutes, and then cooled to room temperature. During the cooling process, the reaction was chased with a catalyst and activator redox pair to reduce residual monomer levels.

In Table 2, below, nDDM stands for n-dodecyl mercaptan, MMA is methyl methacrylate, MAA is methacrylic acid, BA is butyl acrylate and LMA is lauryl methacrylate.

TABLE 2

Polymers and Their Properties

| Polymer No. | Description | Mn | Tg | Hansch |
|---|---|---|---|---|
| 1 | 90 MMA/10 MAA//2.1 nDDM | 9821 | 124 | 1.37 |
| 2 | 90 MMA/10 MAA//5 nDDM | 4242 | 105 | 1.54 |
| 3 | 90 MMA/10 MAA//11 nDDM | 2038 | 67 | 1.88 |
| 4 | 98 MMA/2 MAA//2.1 nDDM | 9821 | 113 | 1.39 |
| 5 | 80 MMA/20 MAA//5 nDDM | 4242 | 120 | 1.51 |
| 6 | 20 LMA/70 MMA/10 MAA//11 nDDM | 2604 | 26 | 2.96 |
| 7 | 20 LMA/60 MMA/20 MAA//11 nDDM | 2604 | 28 | 2.93 |
| 8 | 20 BA/70 MMA/10 MAA//11 nDDM | 2141 | 27 | 2.07 |
| 9 | 40 BA/50 MMA/10 MAA//11 nDDm | 2141 | −4 | 2.25 |
| 10 | 40 LMA/50 MMA/10 MAA//11 nDDM | 3170 | +4 | 4.04 |
| 11 | 98 MMA/2 MAA/1.95 nDDM | 10561 | 111 | 1.28 |
| 12 | 98 MMA/2 MAA//11 nDDM | 2038 | 55 | 1.91 |
| 13 | 20 BA/78 MMA/2 MAA//1.95 nDDM | 11112 | 66 | 1.57 |
| 14 | 40 BA/58 MMA/2 MAA//1.95 nDDM | 11692 | 25 | 1.75 |
| 15 | 98 MMA/2 MAA/5 nDDM | 4242 | 92 | 1.56 |

Examples 1 to 7

Blocking Resistance Tests

The paints for the panels and formulations thereof are, as follows:

The binder in Paint A comprises an acrylic polymer (Tg 13° C., Hansch parameter 2.37). The paint is a low VOC semi-gloss white paint and has a pigment volume content (PVC) of 26.0%, a total solids content of 43.93 wt. %, and 3.0 wt. % of a coalescent.

The binder in Paint B binder comprising an acrylic polymer (Hansch parameter 1.73). The paint is a conventional semi-gloss white paint and has a pigment volume content (PVC) of 21.94%, a total solids content of 47.42 wt. %, and 5.0 wt. % of a coalescent. The binder in Paint B is harder than that in Paint A.

Paint C contains acrylic copolymer, vinyl polymer, titanium dioxide, paraffin oil and had a VOC of 47 g/L. This paint is available as Duron Plastic Kote Semi Gloss, Color=6108 Latte.

Examples 1-1 to 3-3

Influence Of Molecular Weight and Glass Transition Temperature (Tg) on Blocking Resistance of Treated Substrates Painted substrates were treated with a 5 wt. % dispersion of the indicated polymer in water by application with 4 passes of an airbrush on a paint that has dried for 1 day. The treated substrates were evaluated for blocking resistance the same day as treatment.

As shown in Table 3, below, the surface treatments of the present invention substantially improved the resistance of painted surfaces to blocking as compared to the Control, including on substrates painted with a softer paint, paint A. Treatment with polymers having a number average molecular weight (Mn) below 4000 and a Hansch parameter more than 0.35 different than the Hansch parameter of the paint polymer in Example 2-3 gave much better blocking resistance. By contrast, the surface treatment of Example 1-3, where the difference between the surface and treatment Hansch parameters is only 0.15, did not pass the block test on the surface tested. Treatments of polymers having a number average molecular weight (Mn) of above 4000 and a Tg of 20° C. or more greater than the oven block test temperature of 50° C. in Examples 1-1, 1-2, 1-4, 2-1, 2-2, 2-4 and 3-1 gave much better blocking resistance than did the treatments in Examples 1-5, 1-6, 2-5, 2-6, 3-2 and 3-3. At room temperature, the blocking resistance of the surface treatment in Example 2-5 would be expected to pass the block test. The failure of blocking resistance of the polymer in the surface treatment of Examples 3-2 and 3-3 appears to stem from compatibility of the surface of paint C (Tg and Hansch not known) with the surface treatment.

TABLE 3

Influence of Mn and Tg on Blocking Resistance

| Example | Polymer No. | Paint | Result |
|---|---|---|---|
| 1-1 | 1 | B | 7.5 |
| 1-2 | 2 | B | 7 |
| 1-3 | 3 | B | 2.5 |
| 1-4 | 11 | B | 8 |
| 1-5 | 13 | B | 1 |
| 1-6 | 14 | B | 0 |

TABLE 3-continued

Influence of Mn and Tg on Blocking Resistance

| Example | Polymer No. | Paint | Result |
|---|---|---|---|
| Control | None (water) | B | 0 |
| 2-1 | 1 | A | 5 |
| 2-2 | 2 | A | 6.5 |
| 2-3 | 3 | A | 4 |
| 2-4 | 11 | A | 7 |
| 2-5 | 13 | A | 2 |
| 2-6 | 14 | A | 0 |
| Control | None (water) | A | 0 |
| 3-1 | 11 | C | 7 |
| 3-2 | 13 | C | 0 |
| 3-3 | 14 | C | 0 |
| Control | None (water) | C | 0 |

Examples 4-1 to 6-5

Influence Of Acid Content on Blocking Resistance of Treated Substrates

The Examples in Table 3, above, and in Table 4, Examples 4 and 5, were all done on the same day. Painted substrates were treated with a 5 wt. % dispersion of the indicated polymer in water, by application with 4 passes of an air spray gun on a paint that has dried for 1 day. The treated substrates in a given Example were all evaluated for blocking resistance on the same day; thus, for example, the treated substrates of Examples 4-1, and 4-3 were all evaluated on the same day.

TABLE 4

Influence of Acid Content on Blocking Resistance

| Example | Polymer No. | [Acid] in Polymer (mer wt. %) | Paint | Results |
|---|---|---|---|---|
| 4-1 | 1 | 10 | B | 7.5 |
| 4-2 | 4 | 2 | B | 5.5 |
| Control | None | — | B | 0 |
| 5-1 | 1 | 10 | A | 5 |
| 5-2 | 4 | 2 | A | 5.5 |
| Control | None | — | A | 0 |
| 6-1 | 5 | 20 | C | 1 |
| 6-2* | 6 | 10 | C | 4, 5 |
| 6-3* | 7 | 20 | C | 4, 6 |
| Control | None | — | C | 0 |

*Examples were run twice, and block data listed for each run.

As shown in TABLE 4, above, in the surface treatments of the present invention, various amounts of copolymerized acids gave substantially improved the resistance of painted surfaces to blocking.

Examples 7-1 to 8-5

Range Of Glass Transition Temperature (Tg) and Polymer Hydrophobicity on Blocking Resistance of Treated Substrates Painted substrates were treated with a 5 wt. % dispersion of the indicated polymer in water, by application with 4 passes of an airbrush on a paint that has dried for 1 day. The treated substrates in a given Example (e.g. 7-1, 7-2 and 7-3) were all evaluated for blocking resistance on the same day.

Polymers 6-10 are hydrophobic and polymers 9-10 are more hydrophobic and softer. As shown in Table 5, below, surface treatments of the present invention substantially improve the resistance of painted surfaces to blocking when the difference between the Hansch parameter of the treatment polymer and the Hansch parameter of the paint is greater than 0.35.

TABLE 5

Influence of Tg on Blocking Resistance

| Example | Polymer No. | Paint | Results |
|---|---|---|---|
| 7-1 | 8 | B | 3.5 |
| 7-2 | 9 | B | 6.5 |
| 7-3 | 3 | B | 2.5 |
| Control | None | B | 0 |
| 7-4 | 8 | A | 0 |
| 7-5 | 9 | A | 3.5 |
| 7-6 | 3 | A | 4 |
| Control | None | A | 0 |
| 8-1 | 6 | C | 4 |
| 8-2 | 10 | C | 4 |
| 8-3 | 9 | C | 4.5 |
| 8-4 | 8 | C | 5 |
| 8-5 | 4 | C | 6 |
| Control | None | C | 0 |

Examples 9 and 10

Impact of Surface Treatment on Substrate Appearance

Aqueous dispersions of Polymer 4 were spray applied on painted Leneta Charts at the indicated polymer concentration to determine at what concentration the surface treatment becomes a visible treatment. Data is provided for two paint systems, a flat paint in Example 8 and a semi-gloss paint in Example 9. Visibility wass subjectively observed, as stated in Table 6, below, and was measured on the semi-gloss paint with gloss values and on flat paint with color measurements, as shown in Table 7, below.

The flat paint was a Wal-Shield Flat Wall Finish by MAB comprising vinyl acrylic polymer in the color Latte. The semi-gloss paint was Paint C.

TABLE 6

Visual observations Scale:
As shown in the following Table. Far: Arm's length; Near: ~6"-12"; Angle: 6"-12" on angle (person rating visibility holds the panel at an angle).

| Angle rating scale | Near rating scale | Far rating scale |
|---|---|---|
| 0 invisible | 0 Invisible | 0 Pass (invisible) |
| 1 can see faintly | 1 can see if look hard | 1 Fail (easily seen) |
| 2 can see | 2 can just see it | |
| | 3 or 3+ easily see it | |

TABLE 7

Example 9 - Appearance Retention on Flat Paint

| Polymer Conc (%) | ?E vs blank | Visual Rating | | |
|---|---|---|---|---|
| | | Far | Near | Angle |
| 10 | 0.77 | 1 | | |
| 7.5 | 0.5 | 1 | | |
| 5 | 0.41 | 1 | | |
| 5 | 0.47 | 1 | | |

TABLE 7-continued

Example 9 - Appearance Retention on Flat Paint

| Polymer Conc (%) | ΔE vs blank | Visual Rating | | |
|---|---|---|---|---|
| | | Far | Near | Angle |
| 2.5 | 0.22 | 0 | 4 | 2 |
| 1 | 0.18 | 0 | 0 | 0 |
| 1 | 0.34 | 0 | 0 | 0 |
| 0.5 | 0.14 | 0 | 0 | 0 |
| 0 (control) | 0.16 | 0 | 0 | 0 |

As shown in Table 7, above, the surface treatment with Polymer 4 was not visible on a flat paint surface by a ΔE measurement when used at 2.5 wt. %, which indicates minimal color change at a concentration of 2.5 wt. %. The ΔE of 0.22 at a concentration of 2.5 wt. % indicated that Polymer 4 can be used in amounts of 2.5 wt. % without appearing as a visible surface treatment. At a concentration of 2.5 wt. %, the surface treatment with Polymer 4 was visible at 6" to 12" but not at arm's length. In the following Table 8, the 60° gloss was 63.5 before treatment.

TABLE 8

Example 10 - Appearance Retention on Semi-Gloss Paint

| Test Concentration | 60° Gloss Change (loss of gloss after treatment) | Visual | | |
|---|---|---|---|---|
| | | Far | Near | Angle |
| 10 | 24.1 | 0 | 3 | 2 |
| 7.5 | 20 | 0 | 3 | 2 |
| 5 | 15.8 | 0 | 0 | 0 |
| 5 | 14 | 0 | 0 | 0 |
| 2.5 | 7.1 | 0 | 0 | 0 |
| 1 | 2.1 | 0 | 0 | 0 |
| 1 | 4.6 | 0 | 0 | 0 |
| 0.5 | 0.7 | 0 | 0 | 0 |
| 0 (control) | −0.9 (higher gloss) | 0 | 0 | 0 |
| 0 (control) | 0 | 0 | 0 | 0 |
| 0 (control) | 0 | 0 | 0 | 0 |
| 0 (control) | 0 | 0 | 0 | 0 |

As shown in Table 8, above, surface treatments with Polymer 4 were not visible on semi-gloss paint when used at 5 wt. %. At 7.5 wt. %, the surface treatment with Polymer 4 was visible at 6" to 12" but not at arm's length. The surface treatment with Polymer 4 did not impair gloss beyond an acceptable amount at a concentration of 2.5 wt. %, and only impaired gloss beyond an acceptable amount in one of the two tests conducted at a concentration of 5.0 wt. %.

Example 11

Leneta Stain Resistance

The substrate charts used in Example 10 were painted with Glidden Evermore™ Premium Interior Flat paint comprising vinyl-acrylic resin.

TABLE 9

Reflectance Data Before and After Staining

| Example | Polymer No. in Surface Treatment | Initial Y reflectance | Final Y reflectance |
|---|---|---|---|
| 11-1 | 12 | 90 | 86 |
| 11-2 | 3 | 88 | 80 |
| Control | No Treatment | 88 | 62 |

As shown in Table 9, above, the surface treatments of the present invention substantially improved the stain resistance of painted surfaces regardless of whether the acid content was 2 wt. % of polymerized monomer, in Example 11-1, or 10 wt. % thereof, in Example 11-2.

Example 12

Dirt Pickup Resistance (DPUR) of Surface Treatment

In Example 12-1, the aluminum panel was coated with an acrylic latex Semi-gloss paint having a PVC of 22% and a volume solids content of 36%; and, in Example 12-2, the aluminum panel was coated with a water based acrylic primer having a PVC of 26.41% a volume solids content of 34.24%, and 3.0 wt. % of a coalescent. In both Examples 12-1 and 12-2, Polymer no. 4 was used in the surface treatment.

TABLE 10

Reflectance Data Before and After Staining

| Example | Initial Y reflectance | Final Y reflectance, with Treatment | Final Y reflectance, no Treatment |
|---|---|---|---|
| 12-1 | 91 | 76 | 65 |
| 12-2 | 90 | 76 | 59 |

As shown in Table 10, above, the surface treatments of the present invention improve the dirt pickup resistance of painted surfaces.

Example 13

Federal Stain Resistance

The substrate charts used in Example 12 were painted with Glidden paint (see above).

TABLE 11

Reflectance Data Before and After Staining

| Example | Polymer No. in Surface Treatment | Initial Y reflectance | Final Y reflectance |
|---|---|---|---|
| 13-1 | 12 | 90 | 78 |
| 13-2 | 3 | 88 | 81 |
| Control | No Treatment | 89 | 50 |

As shown in Table 11, above, the surface treatments of the present invention which had polymer Mn of just over 2,000 substantially improved the stain resistance of painted surfaces regardless of their acid content.

Example 14

Federal Stain Resistance—Simple Method

The substrate charts used in Example 12 were painted with Wal-Shield Flat Wall Finish by MAB (Color=Latte).

TABLE 12

Reflectance Data Before and After Staining

| Example | Polymer | Initial Y reflectance | Final Y reflectance (No Treatment) | Final Y reflectance (With Treatment) |
|---|---|---|---|---|
| 14-1 | 11 | 38 | 23 | 35 |
| 14-2 | 11 | 37 | 25 | 35 |
| 14-3 | 11 | 37 | 24 | 35 |
| 14-4 | 11 | 37 | 24 | 34 |
| 14-5 | 11 | 37 | 25 | 35 |
| 14-6 | 11 | 37 | 25 | 34 |
| 14-7 | 13 | 38 | 25 | 28 |
| 14-8 | 14 | 38 | 23 | 22 |

As shown in Table 12, above, the surface treatments of the present invention substantially improved the stain resistance of painted surfaces and did so consistently in Examples 14-1 to 14-6. In Example 14-8, the polymer 14 comprised 40 wt. % of butyl acrylate has a Tg of 25° C. which is lower than the temperature of the test conditions, making it tacky and not expected to work.

Example 15

Early Blocking Resistance of Treated Substrates

White Leneta charts were painted with Paint A and were treating by spraying with a 5 wt. % dispersion of the indicated polymer in water after the paint had dried for only 30 minutes. The treated substrates were evaluated for Early Blocking Resistance the same day as treatment and the results determined according to the scale set forth in Table 2, above.

As shown in Table 13, below, the surface treatments of the present invention substantially improved the resistance of painted surfaces to blocking as compared to the Control.

TABLE 13

Early Block Results

| Polymer No. | Result |
|---|---|
| 4 | 7 |
| 12 | 4 |
| 15 | 3.5 |
| Control (water) | 0 |

We claim:

1. A surface treated article having a recoatable surface treatment that imparts stain an dirt pickup resistance to the treated surface and does not change the appearance of the treated surface comprising:
    a painted or coated article or an elastomer film
    surface treated with a surface treatment of one or more dispersion or emulsion of an aqueous acrylic or vinyl polymer consisting essentially of the polymerization product of, (ii) 53 wt. % or more of one or more non-ionic acrylic and/or vinyl comonomer having a solubility in water of less than 5 g/100 g of water at 25 ° C., based on the total weight of polymerized monomers, and (i) an ethylenically unsaturated (poly)carboxylic acid monomer in the amount of from 0 to 47 wt. %, the polymer having a glass transition temperature (Tg) of −10° C. or higher, and a number average molecular weight (Mn) of from 1,000 to 100,000,
    wherein the article comprises the surface treatment in the amount of 0.003 to 2 g of dry polymer per square meter of treated area (g/m$^2$) wherein the surface treatment, when dry, forms domains of polymer distributed all over the treated surface.

2. The article as claimed in claim 1, wherein the one or more acrylic or vinyl polymer in the surface treatment is non-migrating under use conditions.

3. The article as claimed in claim 1, wherein the acrylic or vinyl polymer has a Tg of 30° C. or higher.

4. The article as claimed in claim 1, wherein the acrylic or vinyl polymer surface treatment is substantially fluorine and silicone free.

5. The article as claimed in claim 1, comprising a painted or coated article chosen from windows, window joinery, cabinets, walls, wall trim, floor trim, molding table tops, counter tops doors, door frames, doorskins, furniture, roof rolls, exterior building and construction siding and molding, coated roof tiles, edge sealers, paneling, millwork, office, hardboard, or decking.

6. An easy to clean surface treated article having a surface treatment that is resistant to stains and to dirt or soil comprising:
    an article wholly constructed of and/or laminated with wood, wood fiber, wood particles, wood chips, glass, formica, ceramic, e.g. tile, fiber reinforced plastic, plastic, concrete, paper, aluminum, leather, textiles, fabrics, and non-wovens, which article is surface treated aqueous acrylic or vinyl polymer consisting essentially of the polymerization product of 53 wt. % or more of (ii) one or more non-ionic acrylic and/or vinyl comonomer having a solubility in water of less than 5 g/100 g of water at 25° C. based on the total weight of monomers, and (i) from 0.1 to 25 wt. % of an ethylenically unsaturated acid monomer chosen from an ethylenically unsaturated monocarboxylic acid monomer, from 0.1 to 20 wt. % of an ethylenically unsaturated polycarboxylic acid monomer, from 0.1 to 10 wt. % of an ethylenically unsaturated phosphorus-containing acid monomer, from 0.0 to 10 wt. % of an ethylenically unsaturated sulfur-containing acid monomer, and mixtures thereof, the polymer having an Mn of from 2,000 to 30,000 and a glass transition temperature (Tg) of −10° C. or higher,
    wherein the article comprises the surface treatment in the amount of 0.003 to 2 g of dry polymer per square meter of treated area (g/m$^2$) wherein the surface treatment, when dry, forms domains of polymer distributed all over the treated surface.

7. The article as claimed in claim 6, wherein the acrylic or vinyl polymer surface treatment is substantially fluorine and silicone free.

8. The article as claimed in claim 6 which is chosen from windows, window joinery, doors, cabinets, walls, wall trim, floor trim, molding, table tops, counter tops, vanities, vanity tops, or sink tops.

9. A method for making blocking resistant surface treatment comprising applying the aqueous acrylic or vinyl polymer of claim 1 to a coated or painted article or elastomer film.

10. The method as claimed in claim 9, comprising painting or coating an article and treating freshly applied paint or coating with the aqueous polymer surface treatment 0.05 minute or longer after painting or coating.

* * * * *